(12) United States Patent
Rubin

(10) Patent No.: US 11,188,451 B2
(45) Date of Patent: Nov. 30, 2021

(54) TEST DATA GENERATION FOR AUTOMATIC SOFTWARE TESTING

(71) Applicant: OwnBackup LTD, Tel Aviv (IL)

(72) Inventor: Shai Rubin, Binyamina (IL)

(73) Assignee: OWNBACKUP LTD., Tel Aviv (IL)

( * ) Notice: Subject to any disclaimer, the term of this patent is extended or adjusted under 35 U.S.C. 154(b) by 0 days.

(21) Appl. No.: 16/812,333

(22) Filed: Mar. 8, 2020

(65) Prior Publication Data

US 2021/0279165 A1   Sep. 9, 2021

(51) Int. Cl.
G06F 9/44         (2018.01)
G06F 11/36        (2006.01)

(52) U.S. Cl.
CPC ............................. G06F 11/3672 (2013.01)

(58) Field of Classification Search
None
See application file for complete search history.

(56) References Cited

U.S. PATENT DOCUMENTS

| | | | |
|---|---|---|---|
| 7,107,182 B2 * | 9/2006 | Fujikawa | G06F 11/3672 702/108 |
| 7,865,874 B2 * | 1/2011 | Wookey | G06F 8/61 717/120 |
| 8,539,282 B1 | 9/2013 | Kabanov et al. | |
| 8,649,995 B2 * | 2/2014 | Thulasidasan | G06F 11/3684 702/123 |
| 9,244,818 B1 | 1/2016 | Paleja | |
| 9,529,700 B2 | 12/2016 | Raghavan et al. | |
| 9,582,408 B1 | 2/2017 | Jayaraman et al. | |
| 9,721,116 B2 | 8/2017 | Driesen et al. | |
| 9,734,043 B2 | 8/2017 | Crova et al. | |
| 9,787,779 B2 | 10/2017 | Frank et al. | |

(Continued)

FOREIGN PATENT DOCUMENTS

WO     2013115786 A1    8/2013

OTHER PUBLICATIONS

Commvault Systems. Inc., "Seeding a Salesforce Sandbox", pp. 1-30, Oct. 16, 2019.

(Continued)

*Primary Examiner* — Wei Y Zhen
*Assistant Examiner* — Lanny N Ung
(74) *Attorney, Agent, or Firm* — Kligler & Associates Patent Attorneys Ltd

(57) ABSTRACT

An embodiment features a method of generating test data. An application-level schema corresponding to a source relational database is received. The schema defines constraints comprising one or more of inter-field, inter-record, and inter-object constraints between related data in the source relational database. A random walk is performed on a graph of nodes representing data in the source relational database. At respective ones of the nodes, corresponding ones of the data in the source relational database are selected along a path ordered in accordance with the constraints defined in the schema. Synthetic test data is generated based on one or more statistical models of the data selected from the source relational database. Data values are generated for respective fields of an object defined in the schema, and data values are generated for records related to the object based on one or more of the constraints defined in the schema.

21 Claims, 6 Drawing Sheets

(56) References Cited

U.S. PATENT DOCUMENTS

| | | | |
|---|---|---|---|
| 10,013,333 B2 | 7/2018 | Wood et al. | |
| 10,013,339 B2 | 7/2018 | Athinathan | |
| 10,042,636 B1 | 8/2018 | Srivastava et al. | |
| 10,042,742 B2 | 8/2018 | Jerrard-Dunne et al. | |
| 10,127,144 B2 | 11/2018 | Johnston et al. | |
| 10,223,658 B2 | 3/2019 | Cornilescu | |
| 10,255,152 B2* | 4/2019 | Wei | G06F 11/3672 |
| 10,613,971 B1* | 4/2020 | Vasikarla | G06F 11/3664 |
| 2002/0101920 A1 | 8/2002 | Choi et al. | |
| 2009/0319832 A1* | 12/2009 | Zhang | G06F 11/3684 714/38.1 |
| 2010/0169859 A1* | 7/2010 | Bergman | G06Q 10/06 717/102 |
| 2010/0318481 A1* | 12/2010 | Feynman | G06F 11/3684 706/12 |
| 2013/0139003 A1* | 5/2013 | Patwardhan | G06F 11/3684 714/32 |
| 2014/0007056 A1* | 1/2014 | Leizerovich | G06F 16/2458 717/124 |
| 2014/0143525 A1 | 5/2014 | Taylor, III et al. | |
| 2014/0310690 A1 | 10/2014 | Yang | |
| 2015/0014306 A1 | 1/2015 | Tages | |
| 2016/0246706 A1 | 8/2016 | Sathyamurthy et al. | |
| 2016/0246838 A1 | 8/2016 | Li et al. | |
| 2016/0314062 A1 | 10/2016 | Castro | |
| 2017/0124487 A1 | 5/2017 | Szeto et al. | |
| 2017/0168885 A1* | 6/2017 | Jain | H04L 43/50 |
| 2017/0169370 A1 | 6/2017 | Cornilescu | |
| 2017/0269921 A1 | 9/2017 | Vicente et al. | |
| 2017/0286267 A1 | 10/2017 | Jain et al. | |
| 2018/0024914 A1 | 1/2018 | Yi | |
| 2018/0060210 A1 | 3/2018 | Pandey et al. | |
| 2018/0157485 A1 | 6/2018 | Kugler | |
| 2018/0210821 A1* | 7/2018 | Raghavan | G06F 16/25 |
| 2018/0260312 A1 | 9/2018 | Strachan et al. | |
| 2018/0357154 A1 | 12/2018 | Dolby et al. | |
| 2018/0365133 A1 | 12/2018 | Mitchell et al. | |
| 2019/0370010 A1 | 12/2019 | Iley et al. | |
| 2020/0104246 A1 | 4/2020 | Bhatt | |
| 2020/0151319 A1 | 5/2020 | Sharma et al. | |

OTHER PUBLICATIONS

Ownback Up, "Salesforce® Replication and Sandbox Seeding", fact sheet, p. 1, Oct. 5, 2017.

Salesforce Inc., "Development Lifecycle Guide—Enterprise Development on the Force.com Platform", Version 38.0, Winter '17, pp. 1-77, Oct. 11, 2016.

U.S. Appl. No. 16/503,426 Office Action dated Aug. 3, 2020.

Emek et al., U.S. Appl. No. 16/503,426, filed Jul. 3, 2019.

* cited by examiner

TEST DATA GENERATION FOR AUTOMATIC SOFTWARE TESTING

BACKGROUND

The present disclosure relates to software development and, more specifically, to generating test data for developing software systems, methods, and computer program products. In general, test data can be generated manually, copied from a current production environment, obtained from legacy systems, or generated automatically using automated test data generation tools. Some software applications require large quantities of input test data. Oftentimes such input test data are generated manually, which is labor intensive and oftentimes is inconsistent with current real-world configurations of the systems under test. What is needed is an automated approach for generating test data that is consistent with current real-world configurations of the systems under test.

SUMMARY

Example embodiments described herein provide information management systems and methods for utilizing production data in software testing. The present disclosure relates to software development and, more specifically, to software testing based software development systems, methods, and computer program products in which a system-under-test (SUT) (e.g., an untested software module or other application source code) is populated with test data (e.g., production data or synthetic data). In accordance with this approach, the test data can be automatically generated and seamlessly integrated into a software testing process.

An embodiment features a computer-implemented method of generating test data. In accordance with this embodiment, an application-level schema corresponding to a source relational database is received. The application-level schema defines constraints comprising one or more of inter-field, inter-record, and inter-object constraints between related data in the source relational database. A processor performs a random walk on a graph of nodes representing data in the source relational database and, at respective ones of the nodes, selecting corresponding ones of the data in the source relational database along a path ordered in accordance with the constraints defined in the application-level schema. The processor generates a synthetic test data based on one or more statistical models of the data selected from the source relational database. The processor generates data values for respective fields of an object defined in the application-level schema and generates data values for records related to the object based on one or more of the constraints defined in the application-level schema.

Another embodiment features a test data generation system. This embodiment includes an input module to receive an application-level schema corresponding to a source relational database. The application-level schema defines constraints comprising one or more of inter-field, inter-record, and inter-object constraints between related data in the source relational database. This embodiment also includes a random walk module to perform a random walk on a graph of nodes representing data in the source relational database and, at respective ones of the nodes, selecting corresponding ones of the data in the source relational database along a path ordered in accordance with the constraints defined in the application-level schema. An output module is configured to generate synthetic test data based on one or more statistical models of the data selected from the source relational database. Data values for respective fields of an object defined in the application-level schema are generated, and data values for records related to the object are generated in accordance with one or more of the constraints defined in the application-level schema.

A third embodiment features a computer program product for execution by a computer system and comprising at least one non-transitory computer-readable medium having computer-readable program code portions embodied therein. The computer-readable program code portions comprise an executable code portion configured to receive an application-level schema corresponding to a source relational database, wherein the application-level schema defines constraints comprising one or more of inter-field, inter-record, and inter-object constraints between related data in the source relational database. A second executable code portion is configured to perform a random walk on a graph of nodes representing data in the source relational database and, at respective ones of the nodes, corresponding ones of the data in the source relational database along a path ordered in accordance with the constraints defined in the application-level schema are selected. A third executable code portion is configured to generate synthetic test data based on one or more statistical models of the data selected from the source relational database. Data values are generated for respective fields of an object defined in the application-level schema, and data values for records related to the object in accordance with one or more of the constraints defined in the application-level schema.

Other embodiments are within the scope of the claims.

DETAILED DESCRIPTION

Introduction

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements and are not drawn to scale.

As used herein, the term "or" refers an inclusive "or" rather than an exclusive "or." In addition, the articles "a" and "an" as used in the specification and claims mean "one or more" unless specified otherwise or clear from the context to refer the singular form.

The term "data object" refers to an addressable data file or a subset thereof.

The term "metadata" includes information about data objects or characteristics thereof.

The terms "module," "manager," and "unit" refer to hardware, software, or firmware, or a combination thereof.

Exemplary Embodiments

Figure 1:
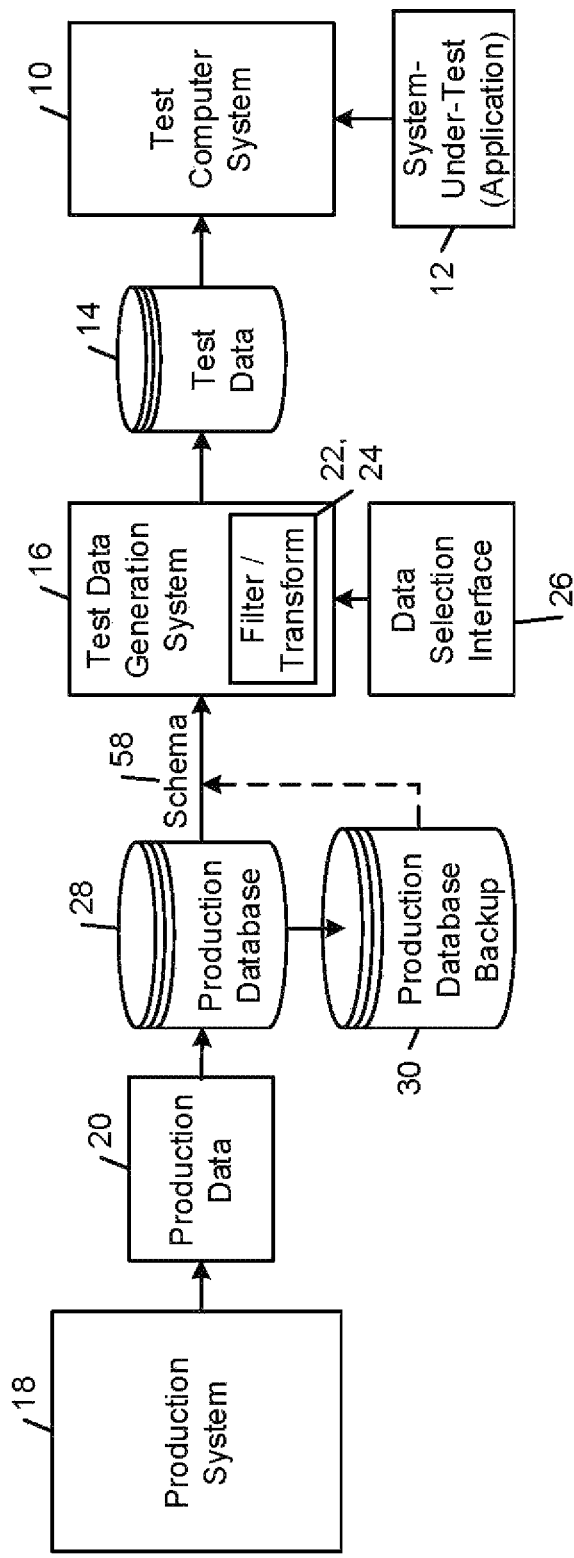
FIG. 1 is a block diagram of an example automated system for generating data for testing a software application.

Referring to FIG. 1, application developers may use a test computer system 10 to build an application 12 (also referred to herein as a "System-Under-Test," or "SUT"). In some embodiments, the application 12 is installed on a dedicated computer on-site. Alternatively, the application 12 is hosted remotely and accessed through an Application Programming Interface (API) according to, for example, a System-as-a-Service (SaaS) model in accordance with which application code is installed in a development environment (e.g., a "sandbox") provided by the SaaS vendor (e.g., Salesforce). The application developers may work on new, updated, or untested application source code or other application-related assets to be tested against test data 14 that is generated by a test data generation system 16 from data produced by a production system 18. As used herein in the context of software development, the qualifier "untested" is used to encompass any of the qualifiers "new," "updated," or "untested."

The application developers may install or load the application 12 on the test computer system 10 for testing one or more of the untested source code modules 12 against the test data 14. In some examples, the test computer system 10 is cloned from the production system 18. In some examples, the test computer system 10 is configured by one or more of the application developers or a test engineer to run a set of predefined tests or scripts on the application 12 after each build. Each test script defines a set of operations for the test computer system 10 to execute with the application 12, either in series or in parallel. Example operations that may be performed on the untested application 12 include loading the application 12, executing the application 12, processing test data 14 with the application 12, and evaluating resource usage by the application 12, execution times for the application 12 to complete certain tasks, application errors, and application failures.

The test computer system 10 may be implemented by an on-site computer system or a remote development environment provided by, for example, a SaaS vendor through an API (Application Programming Interface). In either case, the test computer system 10 executes the application 12 or a discrete component (e.g., a module) of the application 12 on one or multiple test datasets 14 and generates test results. In some examples, the test computer system 10 executes the current build of the application 12 according to testing instructions or scripts that are received from the application developers. In some examples, the application developers may create the testing instructions. In some examples, the test computer system 10 executes the current build of the application 12 with the relevant input parameters of the application 12 populated with test data 14 that are generated by a test data generation system 16 from production data 20 generated by the production system 18. In an example, the test computer system 10 runs the compiled application 12 on a plurality of test data 14 to produce test results, where the test data is generated by the test data generation system 16 from production data 20 produced by the production system 18.

The test computer system 10 collects the test results and reports the test results back to the associated application developers. The test results include performance metrics obtained by executing code modules on particular datasets. Examples of such performance metrics include resource usage, execution times, errors, execution failures, or improper execution of a rule. A variety of different verification mechanisms may be used to evaluate the test results. For example, a test may be configured to detect when the application 12 fails in whole or in part. Another test may be configured to verify an assertion about the behavior of the system is maintained. For example, the number of accounts at the end of a test is twice the number of accounts at the beginning of the test. Expected results can be used to test the system in cases where some aspects of the data in the application are constant between application builds. For example, if the process of populating the parameters of the application 12 always produces five accounts, the expected result of a "count accounts" test always should be five. In some examples, the test results include alerts which may be generated by executing untested application code modules with the test data values 26. In an example, an alert is generated in response to a determination that a code module crashed. In another example, an alert is generated if the behavior of the system changes unexpectedly. For example, an alert is generated if execution of the application 20 on a particular test dataset does not produce the expected result of twice the number of accounts at the beginning of the test. In some examples, the outputs are validated against a set of predefined rules. For example, in accordance with an example rule, if seven records are applied as inputs to the application 12, then seven records are expected to be generated by the application 12.

In some examples, the test data 14 are generated by filtering 22 or transforming 24, or both filtering 22 and transforming 24, a subset of the production data 20 generated by the production system 18 using a data selection user interface 26. In some examples, the test computer system 10 executes the current build of the application 12 against the filtered 22 or transformed 24 real-world production data 20 to produce test results that can be analyzed and processed by the application developers to detect, for example, successes, errors, or failures in the application 12. In this process, the test computer system 10 executes an untested build of the application 12 with a plurality of test data 14 to produce test results based on datasets derived from real-world production data or production-like data.

One of the challenges to achieving effective application development is good testing. Good testing oftentimes requires a large supply of high-quality and up-to-date production-like data. In some examples, there are multiple objectives for the test data. For example, the test data should reflect real-world production data as closely as possible to improve testing quality and, at the same time, reduce the amount of test data needed for testing and storage. In this way, the testing speed can be increased, and data storage costs can be reduced.

Referring back to FIG. 1, in an example, the production system 18 produces production data 20. In some examples, the production data 20 is generated when the production system 18 processes new production data sets. In some examples, the production data 20 is stored in a production database 28 and optionally in at least one backup 30 of the production database 28. The test data generation system 16 is operable to filter 22 and transform 24 the production data 28. In the illustrated example, the production data 28 that is input to the test data generation system 16 may come directly from the production database 28 or restored from the production database backup 30. The production data 20 stored in the production database 28, the at least one production database backup 30, and the test data generation system 16 constitute a test data production pipeline that feeds test data 14 to the system-under-test 12 (i.e., the application). In some examples, the production system 18 is configured to continuously or repeatedly generate new production data 20. This approach increases the likelihood that the production data 20 that is input into the test data generation system 16 is up-to-date and corresponds to the current configuration of the latest build of the application 12.

Figure 2:
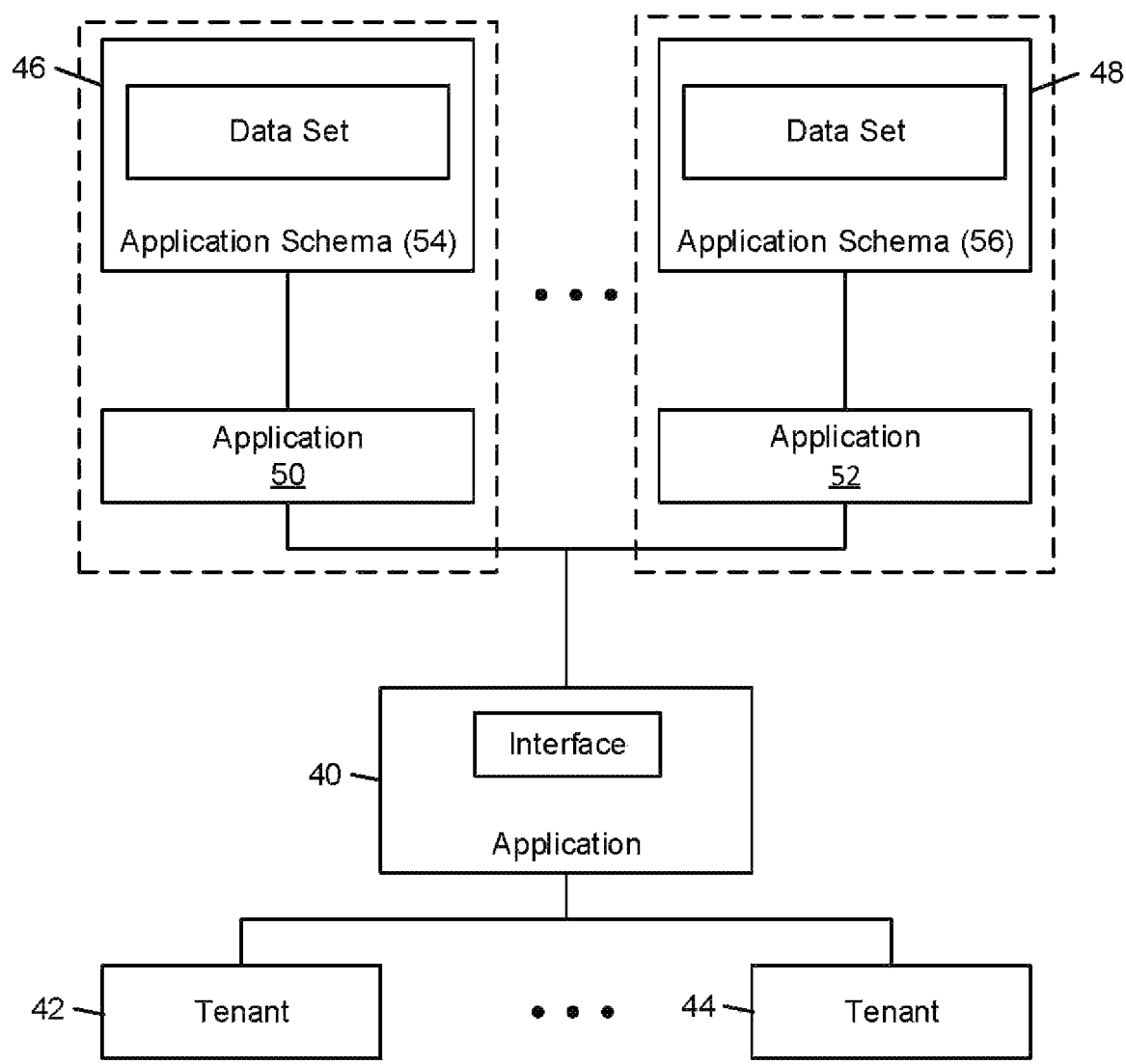
FIG. 2 is a block diagram of an example multi-datastore system configured to serve data from multiple datastores to respective tenants distributed across an environment.

FIG. 2 shows an embodiment of a cloud software delivery model referred to as "Software-as-a-Service" (or SaaS). This mode of software delivery is characterized by multi-tenancy, which allows SaaS vendors to run a single instance of an application and a database to serve multiple tenants 42, 44 with various requirements. A SaaS system includes an application interface 40 to handle requests from tenants 42, 44 by accessing one or more on-premises datastores 46, 48 with respective applications 50, 52. Related cloud computing service delivery models include Infrastructure as a Service (IaaS), Platform as a Service (PaaS), and Desktop as a Service (DaaS).

A SaaS database model of software delivery and related service models provide application-level schemas that are highly structured and detailed, as opposed to a database schema which provides only limited high-level information regarding the relations between objects. In particular, an application schema provides detailed information that identifies the different fields that can be extracted from a SaaS database without the need to examine the application schema manually. In some embodiments, the application schemas 54, 56 for the respective applications 50, 52 provide the names of data fields, the number of data fields, the number of tables, the relations between these elements, and other features of the individual datastores 46, 48 that are accessible by the respective software applications 50, 52. The application schemas 54, 56 may have different respective sets of data fields. For example, the application schema 54 may have a data field that overlaps with a data field of the application schema 56. The application schema 54 may have a data field that is unique to the application schema 54 and not included in the application schema 56 even though the data fields are derived from the same base schema. In some examples, each data field is associated with a name and a data field identifier. A data field name consists of a set of words, text, or characters that are used to reference a particular data field. Data field identifiers are used as references to the data fields by executable code or logic of the applications 50, 52.

In some examples, each application schema 54, 56 is associated with a different respective datastore 46, 48. Each datastore 46, 48 includes one or more data structures for organizing one or more data sets according to the corresponding application schemas 54, 56. Example data structures include a table, an array, a linked list, a tree, and a container (i.e., a collection of data structures). Each datastore 46, 48 typically is organized to enable the contents of the datastore to be accessed, managed, and updated by a respective computer.

Figure 3:
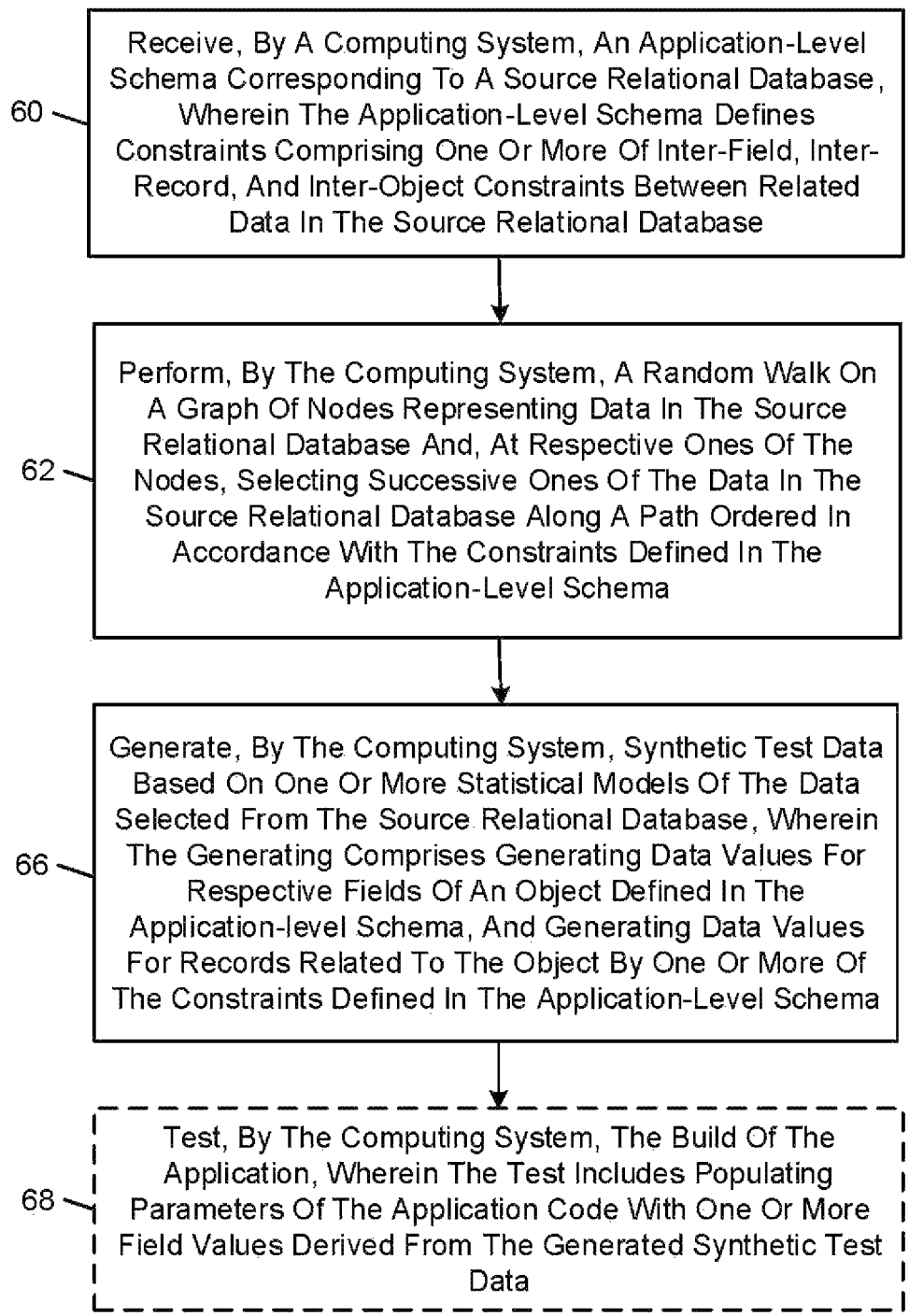
FIG. 3 is a flow diagram of an example method of generating test data for developing and testing a software application.

FIG. 3 shows an example method of developing an application 12 with production data 20 that is processed by the test data generation system 16 (see FIG. 1). In some embodiments, the test data generation system 16 is implemented by a computer system that includes a graphical user interface 26 that enables an application developer to select test data objects from a test data source (e.g., the production database 28 or the production database backup 30). In some examples, the selected test data objects are organized in a record-by-record arrangement of objects representing data that is relevant to the performance of a particular test on the application 12.

In operation, the test data generation system 16 loads an application-level schema 58 of a source relational database (e.g., the production database 28) (FIG. 3, block 60). The application-level schema defines constraints that include one or more of inter-field, inter-record, and inter-object constraints between related data in the source relational database.

In some examples, the test data generation system 16 accesses production data 20 from the production database 28 or the production database backup 30. The production database 28 stores data that is produced by the production system 18; the production database backup 30, on the other hand, stores a snapshot of the state of the production database 28 at a particular time in the past, such as a month ago, a year ago, or longer. In some examples, the production system 18 executes a database application to load the production data 20 into the production database 28. In other examples, the production data 20 is organized in a non-database data storage format (e.g., JSON, XML, CSV, and NOSQL).

The test data generation system 16 performs a random walk on a graph of nodes representing data in the source relational database 28 or a restored version of the production database backup 30 (FIG. 3, block 62). At respective ones of the nodes, test data generation system 16 selects successive ones of the data in the source relational database along a path ordered in accordance with the constraints defined in the application-level schema.

In some embodiments, either automatically or based on user input, the test data generation system 16 selects the data records in accordance with a random walk on a graph to create random data. The random walk is subject to the constraints described in the application schema 58. In some embodiments, the test data generation system 16 performs a random walk on a graph of nodes representing data records in the production database 28. In some embodiments, the test data generation system 16 performs a random walk on a regular graph or lattice. In some examples, each step involves moving to another location in the graph according to a specified probability distribution (e.g., a uniform probability distribution). In some embodiments, each step from the current position in the random walk is restricted to the positions on the graph that are adjacent to the current position, and the probability of stepping on any adjacent position is the same and is subject to the constraints described in the application schema 58.

In operation, the test data generation system 16 executes an automated random walk on a graph that creates random test data according to the constraints described in the application schema. In this approach, the universe of potential test data is a graph of all potential records that in any way could be connected to one another. The process starts at an initial randomly selected record and continues to execute a random walk record-to-record, from the initial randomly selected record until the test data generation system 16 reaches one of the above-described stopping criteria (e.g., when a target level of data records has been generated).

Referring back to FIG. 3, in some embodiments, the test data generation system 16 generates synthetic test data based on one or more statistical models of the data selected from the source relational database (FIG. 3, block 66). In some embodiments, the test data generation system 16 generates data values for respective fields of an object defined in the application-level schema, and further generates data values for records related to the object by one or more of the constraints defined in the application-level schema.

In some examples, the test computer system 10 is operable to test the build of the application 12. In these examples, the test includes populating parameters of the application code with one or more field values derived from the generated synthetic test data (FIG. 3, block 68).

As explained in detail below, in some examples, the test data generation system 16 notifies the user when a mandatory parent record is needed to support the generation of a particular record, and automatically guides the creation of respective data sets that include the mandatory parent records and their respective related records.

In an example, based on input by an application developer, the test data generation system 16 starts one or more random walks in parallel from one or more respective nodes of a particular data type (e.g., an opportunity, a case, a task, etc.). In an example embodiment in which the application developer is interested in opportunities, the test data generation system 16 incrementally selects data records from a set of the production data 20 that is related to opportunities. In an example, the test data generation system 16 starts a random walk by generating a random opportunity. From the generated opportunity, the test data generation system 16 walks to a random mandatory account and generates the mandatory account. From the mandatory account, the test data generation system 16 walks to a random mandatory case and generates the mandatory case. From the mandatory case, the test data generation system 16 walks to a random task and generates the task.

In some embodiments, the test data generation system 16 terminates a random walk when it arrives at a record that does not have any other mandatory records to point to or that are already filled. Alternatively, the test data generation system 16 terminates the random walk in response to a determination that the total number of records reaches a target number of records. At this point, the test data generation system terminates the random walk.

In some examples, the test data generation system 16 may perform tests on the application based on actual production data (e.g., records in the production database 28). However, the supply of high-quality production data 20 typically is limited.

To make-up for the limited supply of production data 20, synthetic data oftentimes is used to test applications. Synthetic data typically is derived from records in the production database 28. In some embodiments, the test data generation system 16 generates synthetic test data 14 from one or more records along the path of records selected from the production database 28 (FIG. 3, block 66). In an example, the test data generation system 16 randomly selects a first record from the production database 28 and generates synthetic test data from the first set of one or more records. The synthetic test data may be generated using any of a wide variety of test data generation methods known in the art. For example, in some embodiments, the test data generation system 16 generates synthetic data as a function of numeric field values in a column of records in a database table. In some of these embodiments, the test data generation system 16 generates the synthetic data based on a statistical model of the field values in the column of records stored in the database table. In some embodiments, the test data generation system 16 selects one or more numeric fields in the application schema and performs statistical analyses on the selected fields to determine statistical profiles of the numeric field values (e.g., minimum values, maximum values, average values, and sparseness of the values associated with the fields). The statistical profiles then may be used to generate random numeric data that approximate the attribute values of the one or more data fields. The test data generation system 16 is also operable to generate random discrete synthetic data field values, such as telephone numbers, social security numbers, and mailing addresses, in accordance with methods known in the art.

After generating synthetic test data field values for the first set of one or more records, the test data generation system 16 continues to randomly generate synthetic data (e.g., record-by-record) by incrementally generating successive synthetic test data field values that are related or constrained to the first record. In this process, the application schema 54, 56 dictates the order in which the synthetic data is generated, where the order is inferred from the application schema 54, 56.

In general, there are several types of randomness involved in the process of generating synthetic test data. A first type of randomness involves selecting the types of objects to generate and the quantities of the objects of the different types that are generated. For example, the test data generation system 16 may generate a single parent node and multiple child nodes that depend from the single parent node. There also is a level of randomness in the density of the generated records. For example, test data may be generated sparsely, or a large amount of test data may be generated densely. Another type of randomness concerns the values of the various fields that are generated in different ways. For example, a data field value can be generated completely randomly; a data field value can be generated based on the statistics of the data field values stored in the production database 28; and a data field value can be generated from a backup 30 of data created in the past to generate random data or generate statistically equivalent data from a backup of a set of data values in the past (e.g., a year ago). Another level of randomness relates to the variety of types of data fields in the sets of records that are generated.

In some embodiments, the test data generation system 16 filters 22 and transforms 24 the production data 20 that is stored in the production database 28 to produce a filtered set of the test data 14. In this process, the test data generation system 16 automatically selects a set of the production data 20 from, for example, the production database 28 or the production database backup 30. Alternatively, a developer or test engineer may manually select the set of production data using, for example, a database application executing on a computer system 16 (e.g., a client computer) to generate a graphical user interface 26 that displays views on the database of data objects representing production data (e.g., the production database 28 or the restored production database backup 30). In some examples, the database application enables the user to manually select parent objects and replicate a data set that includes the selected parent objects and their respective descendant related records. In some examples, the replicated data set is migrated to a development environment hosted by, for example, a SaaS vendor.

Referring back to FIG. 3, in an optional embodiment, the test computer system 10 is configured to perform tests on the application 12 or modules of the application 12, where the test includes populating parameters of the application code with one or more test data field values (FIG. 3, block 68). In the illustrated example, the production data 28 that is input to the test data generation system 16 may come directly from the production database 28, restored from the production database backup 30, or synthetically generated from production data. In some examples, the production data 28 may be filtered 22 or transformed 24 before the test data 14 is uploaded to the test computer system 10 (e.g., to remove or obfuscate personally identifiable information). The production data 20 stored in the production database 28, the at least one production database backup 30, and the test data generation system 16 constitute a test data production pipeline that feeds production test data, synthetic test data 14, or both, to the system-under-test 12. In some examples, the production system 18 is configured to continuously or repeatedly generate new production data 20.

Figure 4:
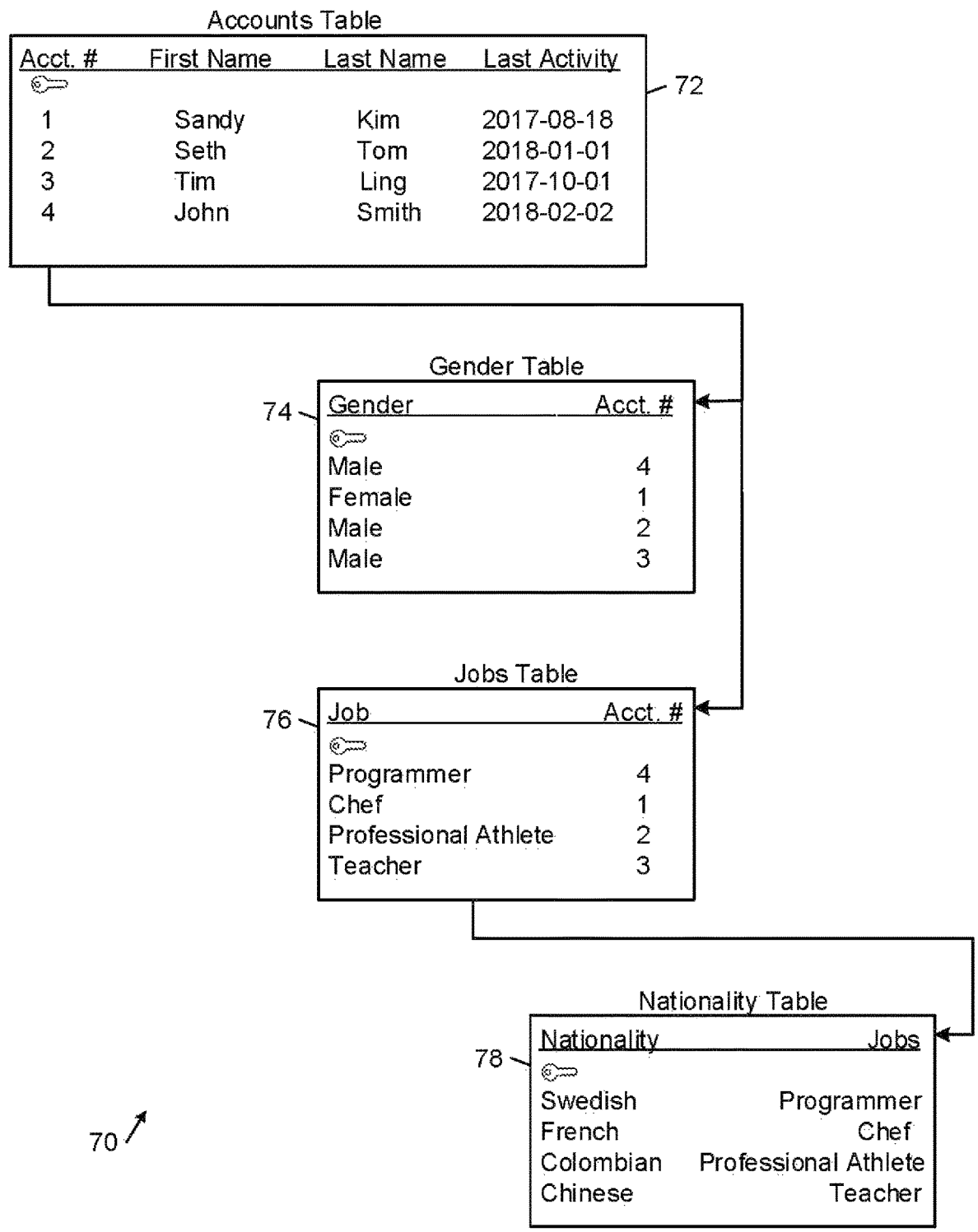
FIG. 4 shows an exemplary schematic representation of a database that is organized into a set of tables.

A common data generation approach involves generating data table-by-table (see FIG. 4). In an example of this type of approach, first all the cases are generated in a first table, then all the accounts are generated in a second table, then all the tasks are generated in a third table, and so on. FIG. 4 shows an exemplary schematic representation of an example production database 70 that is organized into a set of tables 72, 74, 76, 78 and their respective dependencies according to a database schema. As explained above, prior methods of generating test data involve generating data table-by-table. In the illustrated example, the tables 72, 74, 76, 78 include an Accounts Table 72, a Gender Table 74, a Jobs Table 76, and a Nationality Table 78. In accordance with an example of the table-by-table data generation approach, first all the accounts in the Accounts Table 72 are generated, next all the genders in the Gender Table 74 are generated, then all the jobs in the Jobs Table 76 are generated, and all the nationalities in the Nationality Table 78 are generated. The Accounts Table 72 has an Account Number attribute, a First Name attribute, a Last Name attribute, and a Last Activity attribute that contains the date of last activity date associated with the corresponding Account Number, where the Account Number is a primary key that uniquely identifies each row of the Accounts Table 72. The Gender Table 74 has a Gender attribute and an Account Number attribute, where Gender is a primary key that uniquely identifies each row in the Gender Table 74 and the Account Number is a foreign key that cross-references the Accounts Table 72. The Jobs Table 76 has a Job attribute and an Account Number attribute, where Job is a primary key that uniquely identifies each row in the Jobs Table 76 and the Account Number is a foreign key that cross-references the Accounts Table 72. The Nationality Table 78 has a Nationality attribute and a Jobs attribute, where the Nationality is a primary key that uniquely identifies each row in the Nationality Table 78 and the Jobs Table 76 is a foreign key that cross-references the Nationality Table 78.

Figure 5:
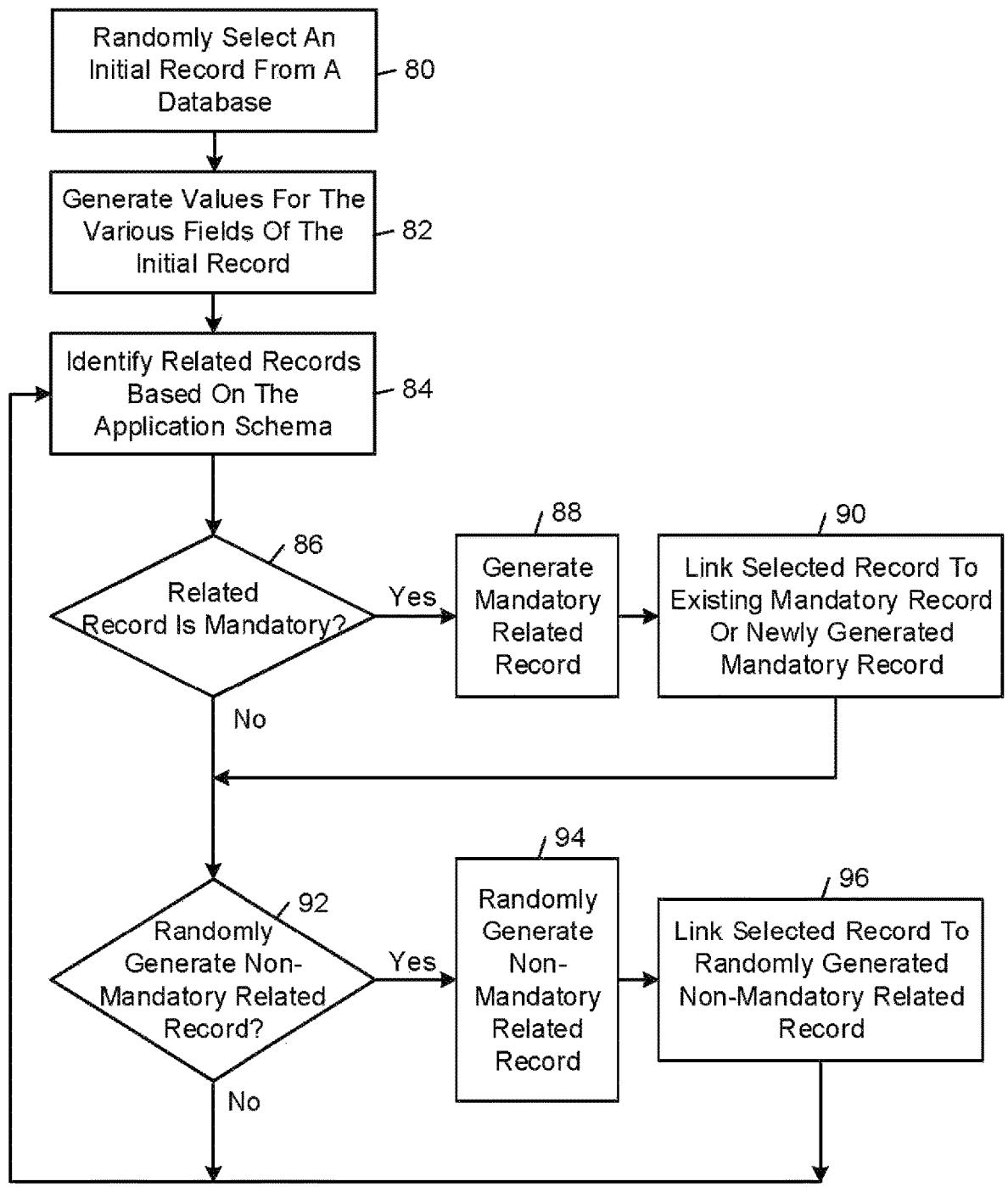
FIG. 5 is a flow diagram of an example method of generating test data for developing a software application.

In contrast with the table-by-table data generation approach, FIG. 5 shows an embodiment of a method of generating test data for automatic software testing in accordance with which the test data generation system 16 generates test data (e.g., production data, synthetic data, or both) record-by-record in the course of performing a random walk along a path of records ordered in accordance with the constraints described in the application-level schema 58. In this process, production data, generated synthetic data, or both, is generated for the data fields of one or more records along the defined path based on one or more of the data records extracted from the production database 28, as described above.

Referring to FIG. 5, the method of generating test data for automatic software testing involves randomly selecting an initial record from a database (FIG. 5, block 80). In some embodiments, the test data generation system 16 automatically generates the test data for automatic software testing based on the production data 20 stored in the production database 28. In some embodiments, an application developer may manually operate the test data generation system 16 using the data selection interface 26 (see FIG. 1). The test data generation system 16 generates values for the various fields of the initial record (FIG. 5, block 82). The field values for the initial record may be copied from the initial record. Alternatively, the field values may be synthetically generated based on the production field values. Examples of the types of synthetic field values that may be generated include field values, such as telephone numbers, social security numbers, and mailing addresses. The field values may be generated in a variety of ways, including randomly generated or statistically generated based on a model of the relevant production data. Once the data for the set of fields of the initial record are generated, the field values of related records can be generated. As explained above, the application schema 58 is sufficiently detailed to enable the test data generation system 16 to identify and follow the records that are related to the initial randomly selected record (FIG. 5, block 84).

In the SaaS database model of software delivery, there are dependent records that require mandatory records in order for certain dependent records to exist. Examples of mandatory records are account records and case records. If the initial record selected from the production database 28 is a dependent record, a mandatory parent record is required. If a mandatory parent record currently exists (FIG. 5, block 86), the mandatory related record is generated (FIG. 5, block 88) and the initial randomly selected record may be linked to the existing mandatory record; and if a mandatory parent record does not currently exist, the mandatory parent record is generated, and the initial selected record is linked to the generated mandatory parent record (FIG. 5, block 90).

Thus, once the set of data field values are generated for the initial object, data is generated for the related records. In this process, the application schema is used to identify the related records. Some of the related records are mandatory related records and non-mandatory related records. The mandatory related records must be generated. Examples of mandatory related records are an account record and a case record. A case record is a type of record that cannot exist without being connected to a parent record, such as an account record or another case record. In illustrated embodiments, the test data generation system 16 is configured to identify and generate mandatory related records.

The test data generation system 16 also is configured to generate non-mandatory related records (FIG. 5, block 92). In some embodiments, the test data generation system 16 is configured to generate non-mandatory related records on a random basis (FIG. 5, block 94). For example, in some embodiments, the test data generation system 16 determines whether or not to generate a non-mandatory related record based on a specified probability (e.g., 50%) of generating the non-mandatory record. After generating a non-mandatory related record, the test data generation system 16 links the initial selected record to the randomly generated non-mandatory related record (FIG. 5, block 96).

In some embodiments, the test data generation system 16 can stop generating data when it processes a particular record that does not have any other mandatory records that the particular record needs to point to or that are already filled. Alternatively, the test data generation system 16 can stop generating data when the total number of records reaches a target amount.

Referring back to FIG. 3, after a sufficient quantity of test data has been collected, the test data is loaded into test computer system 10. In some embodiments, the test data records are uploaded to the test computer system 10 directly (e.g., with an insert statement into an SQL database). Alternatively, the data can be stored in an intermediary format, such as JSON, XML, CSV, and NOSQL, and then loaded into the test computer system 10. The order the data is loaded into the test computer system 10 depends on the application schema 58. Thus, if each opportunity must belong to an account, then the test computer system 10 will start by loading the accounts, followed by loading the opportunities, and so on.

The above-described process may lead to circular dependencies. If so, the test computer system 10 will have to load the test data multiple times to resolve the circular dependency. For example, assuming there is an opportunity A and an opportunity B that also depends on opportunity A. In this case, opportunity A is loaded into the test computer system, and then opportunity B is loaded. After opportunity B is loaded into the test computer system 10, then configure opportunity A to point to opportunity B in the test computer system 10.

The random walk defines the order in which the nodes are loaded into the test computer system 10 and the question of when to load a node into the test computer system is solved by the random walk. If node A depends on node B, then node A cannot be inserted into the system until node B is inserted. Thus, the test computer system 10 stops on node A, then generates node B. If node B does not depend on any other node, then node B can be loaded into the system. Now the test computer system continues the random walk from node A by completing the generation of node A and inserting node A into the system.

Exemplary Computer Apparatus

Figure 6:
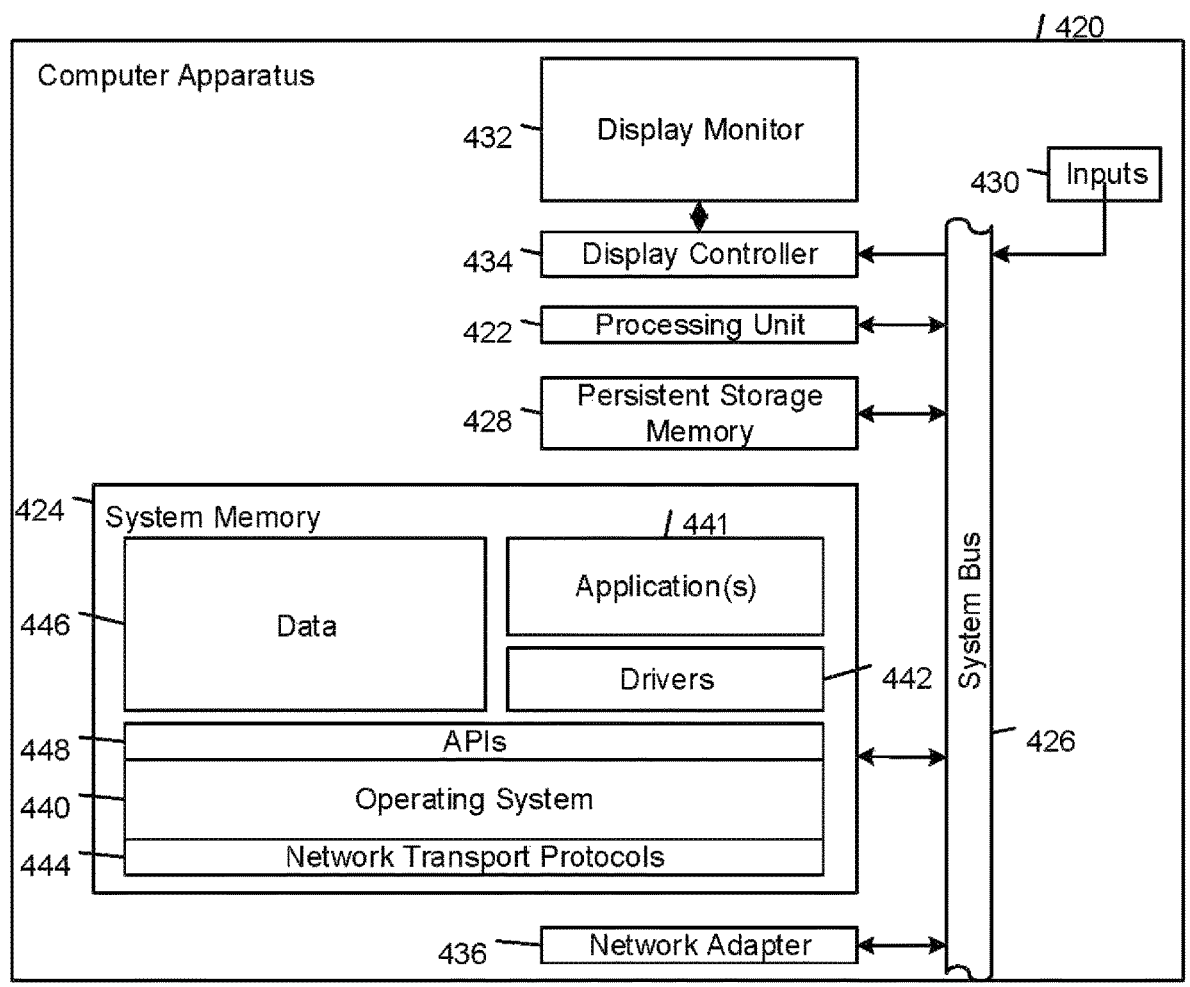
FIG. 6 is a block diagram of an example computer apparatus.

FIG. 6 shows an example embodiment of computer apparatus that is configured to implement one or more of the computing systems described in this specification. The computer apparatus 420 includes a processing unit 422, a system memory 424, and a system bus 426 that couples the processing unit 422 to the various components of the computer apparatus 420. The processing unit 422 may include one or more data processors, each of which may be in the form of any one of various commercially available computer processors. The system memory 424 includes one or more computer-readable media that typically are associated with a software application addressing space that defines the addresses that are available to software applications. The system memory 424 may include a read only memory (ROM) that stores a basic input/output system (BIOS) that contains start-up routines for the computer apparatus 420, and a random access memory (RAM). The system bus 426 may be a memory bus, a peripheral bus or a local bus, and may be compatible with any of a variety of bus protocols, including PCI, VESA, Microchannel, ISA, and EISA. The computer apparatus 420 also includes a persistent storage memory 428 (e.g., a hard drive, a floppy drive, a CD ROM drive, magnetic tape drives, flash memory devices, and digital video disks) that is connected to the system bus 426 and contains one or more computer-readable media disks that provide non-volatile or persistent storage for data, data structures and computer-executable instructions.

A user may interact (e.g., input commands or data) with the computer apparatus 420 using one or more input devices 430 (e.g. one or more keyboards, computer mice, microphones, cameras, joysticks, physical motion sensors, and touch pads). Information may be presented through a graphical user interface (GUI) that is presented to the user on a display monitor 432, which is controlled by a display controller 434. The computer apparatus 320 also may include other input/output hardware (e.g., peripheral output devices, such as speakers and a printer). The computer apparatus 420 connects to other network nodes through a network adapter 336 (also referred to as a "network interface card" or NIC).

A number of program modules may be stored in the system memory 424, including application programming interfaces 438 (APIs), an operating system (OS) 440 (e.g., the Windows® operating system available from Microsoft Corporation of Redmond, Wash. U.S.A.), software applications 441 including one or more software applications programming the computer apparatus 420 to perform one or more of the steps, tasks, operations, or processes of the hierarchical classification systems described herein, drivers 442 (e.g., a GUI driver), network transport protocols 444, and data 446 (e.g., input data, output data, program data, a registry, and configuration settings).

Examples of the subject matter described herein, including the disclosed systems, methods, processes, functional operations, and logic flows, can be implemented in data processing apparatus (e.g., computer hardware and digital electronic circuitry) operable to perform functions by operating on input and generating output. Examples of the subject matter described herein also can be tangibly embodied in software or firmware, as one or more sets of computer instructions encoded on one or more tangible non-transitory carrier media (e.g., a machine readable storage device, substrate, or sequential access memory device) for execution by data processing apparatus.

The details of specific implementations described herein may be specific to particular embodiments of particular inventions and should not be construed as limitations on the scope of any claimed invention. For example, features that are described in connection with separate embodiments may also be incorporated into a single embodiment, and features that are described in connection with a single embodiment may also be implemented in multiple separate embodiments. In addition, the disclosure of steps, tasks, operations, or processes being performed in a particular order does not necessarily require that those steps, tasks, operations, or processes be performed in the particular order; instead, in some cases, one or more of the disclosed steps, tasks, operations, and processes may be performed in a different order or in accordance with a multi-tasking schedule or in parallel.

Other embodiments are within the scope of the claims.

The invention claimed is:

1. A computer-implemented method of generating test data, comprising:
receiving an application-level schema corresponding to a source relational database, wherein the application-level schema defines constraints comprising one or more of inter-field, inter-record, and inter-object constraints between related data in the source relational database;
performing, by a processor, a random walk on a graph of nodes representing data in the source relational database and, at respective ones of the nodes, selecting corresponding ones of the data in the source relational database that define a path ordered in accordance with the constraints defined in the application-level schema;
generating, by the processor, synthetic test data based on one or more statistical models of the data selected from the source relational database, wherein the generating comprises generating data values for respective fields of an object defined in the application-level schema, and generating data values for records related to the object based on one or more of the constraints defined in the application-level schema;

populating parameters of a software application under test with one or more field values derived from the synthetic test data; and running the software application with the populated parameters on a computer system so as to generate test results.

2. The computer-implemented method of claim 1, wherein performing the random walk comprises, by the processor, generating data from successive object nodes in the graph.

3. The computer-implemented method of claim 2, wherein performing the random walk comprises generating test data record-by-record while performing a random walk along a path of records ordered in accordance with the constraints described in the application-level schema.

4. The computer-implemented method of claim 2, wherein performing the random walk comprises, by the processor, selecting successive data from adjacent nodes in the graph subject to the constraints defined in the application-level schema.

5. The computer-implemented method of claim 1, wherein the generating comprises, by the processor, generating synthetic test data for different types of nodes in the graph.

6. The computer-implemented method of claim 5, wherein the generating comprises, by the processor, generating synthetic data for a parent node and multiple child nodes that depend from the parent node.

7. The computer-implemented method of claim 1, wherein the generating comprises, by the processor, generating the synthetic test data field values with a density that varies depending on node type.

8. The computer-implemented method of claim 1, wherein the generating comprises, by the processor, generating the synthetic test data field values with variable levels of randomness.

9. The computer-implemented method of claim 8, wherein the generating comprises, by the processor, generating the synthetic test data field values randomly.

10. The computer-implemented method of claim 8, wherein the generating comprises, by the processor, generating the synthetic test data field values based on statistics of the corresponding data field values in the source relational database.

11. The computer-implemented method of claim 8, wherein the generating comprises, by the processor, generating the synthetic test data field values based on data field values selected from a data backup comprising data field types corresponding to the data field types in the source relational database.

12. The computer-implemented method of claim 8, wherein the generating comprises, by the processor, generating the synthetic test data field values in quantities that vary depending on data field type.

13. The computer-implemented method of claim 1, further comprising generating a mandatory parent record for a dependent record based on a determination that the dependent record exists without a parent record.

14. The computer-implemented method of claim 1, further comprising, by the processor:

generating a mandatory related record based on a determination that a mandatory parent record exists; and
linking the mandatory related record to the existing mandatory parent record.

15. The computer-implemented method of claim 1, further comprising, by the processor:

generating a mandatory parent record based on a determination that the mandatory parent record does not exist; and
linking the generated mandatory parent record to a generated mandatory record.

16. The computer-implemented method of claim 1, further comprising, by the processor, randomly generating one or more non-mandatory related records.

17. The computer-implemented method of claim 1, further comprising, by the processor, terminating the generating in response to a determination that a mandatory record has been processed and there is no other mandatory record to which the processed record is required to point.

18. The computer-implemented method of claim 1, further comprising, by the processor, terminating the generating in response to a determination that a total number of records has reached a target amount.

19. The computer-implemented method of claim 1, further comprising, by the processor: loading records into a test computer system in an order according to the random walk; detecting a circular dependency between a first record and a second record; and resolving the circular dependency by configuring the first record to point to the second record in the test computer system.

20. A test data generation system, comprising:

an input module to receive an application-level schema corresponding to a source relational database, wherein the application-level schema defines constraints comprising one or more of inter-field, inter-record, and inter-object constraints between related data in the source relational database;

a random walk module to perform a random walk on a graph of nodes representing data in the source relational database and, at respective ones of the nodes, selecting corresponding ones of the data in the source relational database that define a path ordered in accordance with the constraints defined in the application-level schema;

an output module configured to generate synthetic test data based on one or more statistical models of the data selected from the source relational database, wherein the generating comprises generating data values for respective fields of an object defined in the application-level schema, and generating data values for records related to the object based on one or more of the constraints defined in the application-level schema; and a test module configured to populate parameters of a software application under test with one or more field values derived from the synthetic test data and to run the software application with the populated parameters on a computer system so as to generate test results.

21. A computer program product for execution by a computer system and comprising at least one non-transitory computer-readable medium having computer-readable program code portions embodied therein, the computer-readable program code portions comprising:

an executable code portion configured to receive an application-level schema corresponding to a source relational database, wherein the application-level schema defines constraints comprising one or more of inter-field, inter-record, and inter-object constraints between related data in the source relational database;

an executable code portion configured to perform a random walk on a graph of nodes representing data in the source relational database and, at respective ones of the nodes, selecting corresponding ones of the data in the source relational database that define a path ordered in accordance with the constraints defined in the application-level schema;

an executable code portion configured to generate synthetic test data based on one or more statistical models of the data selected from the source relational database, wherein the generating comprises generating data values for respective fields of an object defined in the application-level schema, and generating data values for records related to the object based on one or more of the constraints defined in the application-level schema; and an executable code portion configured to populate parameters of a software application under test with one or more field values derived from the synthetic test data and to run the software application with the populated parameters on the computer system so as to generate test results.

* * * * *